(12) United States Patent
Gull et al.

(10) Patent No.: US 7,015,599 B2
(45) Date of Patent: Mar. 21, 2006

(54) BACKUP POWER MANAGEMENT SYSTEM AND METHOD OF OPERATING THE SAME

(75) Inventors: Philip Gull, West Allis, WI (US);
Wesley C. Sodemann, Dousman, WI (US)

(73) Assignee: Briggs & Stratton Power Products Group, LLC, Jefferson, WI (US)

( * ) Notice: Subject to any disclaimer, the term of this patent is extended or adjusted under 35 U.S.C. 154(b) by 474 days.

(21) Appl. No.: 10/609,108

(22) Filed: Jun. 27, 2003

(65) Prior Publication Data

US 2004/0262997 A1  Dec. 30, 2004

(51) Int. Cl.
*H02J 9/04* (2006.01)

(52) U.S. Cl. .................... 307/85; 307/86; 307/64; 700/295

(58) Field of Classification Search ............ 307/64, 307/85, 86; 700/295
See application file for complete search history.

(56) References Cited

U.S. PATENT DOCUMENTS

| | | | |
|---|---|---|---|
| 3,573,576 A | 4/1971 | Nakabo | |
| 4,211,933 A | 7/1980 | Hedges et al. | |
| 4,228,364 A | 10/1980 | Walden | |
| 4,324,987 A | 4/1982 | Sullivan, II et al. | |
| 4,336,462 A | 6/1982 | Hedges et al. | |
| 4,890,212 A | 12/1989 | Kumon et al. | |
| 5,231,565 A | 7/1993 | Bilas et al. | |
| 5,239,253 A | 8/1993 | Shimizu et al. | |
| 5,436,510 A | 7/1995 | Gilbert | |
| 5,455,760 A | 10/1995 | Bilas et al. | |
| 5,536,976 A | 7/1996 | Churchill | |
| 5,754,445 A | 5/1998 | Jouper et al. | |
| 5,861,683 A | 1/1999 | Engel et al. | |
| 5,986,353 A | 11/1999 | Kohler | |
| 6,028,373 A | 2/2000 | Kim et al. | |
| 6,046,513 A | 4/2000 | Jouper et al. | |
| 6,066,897 A | 5/2000 | Nakamura | |
| 6,172,432 B1 | 1/2001 | Schnackenberg et al. | |
| 6,285,178 B1 | 9/2001 | Ball et al. | |
| 2003/0075982 A1 | 4/2003 | Seefeldt | |

OTHER PUBLICATIONS

Eaton | Cutler-Hammer; Pub-49439 Rev. (5) ECN-SOB-0270; Aug. 16, 2001; p. 15.
Eaton | Cutler-Hammer; Eaton Corporation Now Offers the Cutler-Hammer Remote Controlled Circuit Breakers; printed on Mar. 29, 2002 from http://www.eatonelectrical.com/NASApp/cs/ContentServer?pagename=C-H/Common/AssetTemplateLink&c=Apubarticles&cid=1001691747031&Sec=documents; 1 page.

(Continued)

*Primary Examiner*—Brian Sircus
*Assistant Examiner*—Dru Parries
(74) *Attorney, Agent, or Firm*—Michael Best & Friedrich LLP

(57) ABSTRACT

A backup power management system connectable to a primary power source and a secondary power source, and a method of operating the same. The system includes a transfer switch connectable to the primary and secondary power sources, and a plurality of circuit branches connected to the transfer switch. The circuit branches include first and second remotely operated branches having first and second managed circuit breakers, respectively. The system further includes a controller connected to the first and second managed circuit breakers. The controller controls the managed circuit breakers, thereby controlling the current through the first and second managed circuit branches.

24 Claims, 11 Drawing Sheets

OTHER PUBLICATIONS

Eaton | Cutler-Hammer; Integrated Facility Panelboards; printed on Mar. 29, 2002 from http://www.eatonelectrical.com/NASApp/cs/ContentServer?pagename=C-H/Common/AssetTemplateLink&c=Apubarticles&cid=1012857084263&Sec=documents; 2 pages.

Eaton | Cutler-Hammer; Integrated Facility Switchboards; printed on Mar. 29, 2002 from http://www.eatonelectrical.com/NASApp/cs/ContentServer?pagename=C-H/Common/AssetTemplateLink&c=Apubarticles&cid=985243684647&Sec=documents; 2 pages.

Eaton | Cutler-Hammer; Smart Breaker; printed on Mar. 29, 2002 from http://www.eatonelectrical.com/NASApp/cs/ContentServer?pagename=C-H/Common/AssetTemplateLink&c=Apubarticles&cid=1012857125625&Sec=documents; 1 page.

Eaton | Cutler-Hammer; Distributor Newsline; Changes emphasize value of Eaton name; Aug. 2001; 2 pages.

Heart Interface Corporation, A Valley Forge Company; Owner's Manual—AC Load Manager 120/240VAC; Part No.: 90-0116-00 CE PN:890022 Rev. 1.1; Jul. 21, 1997; 24 pages.

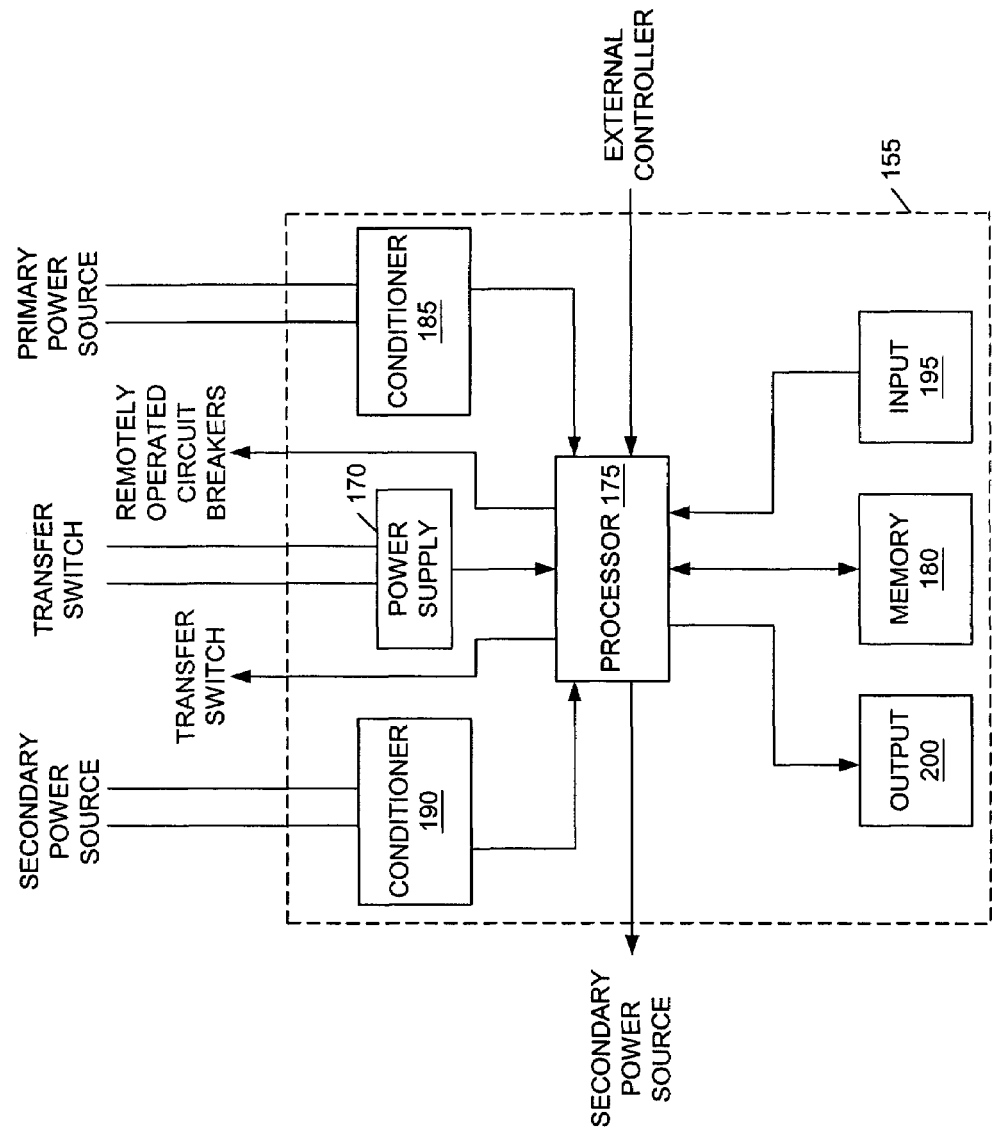

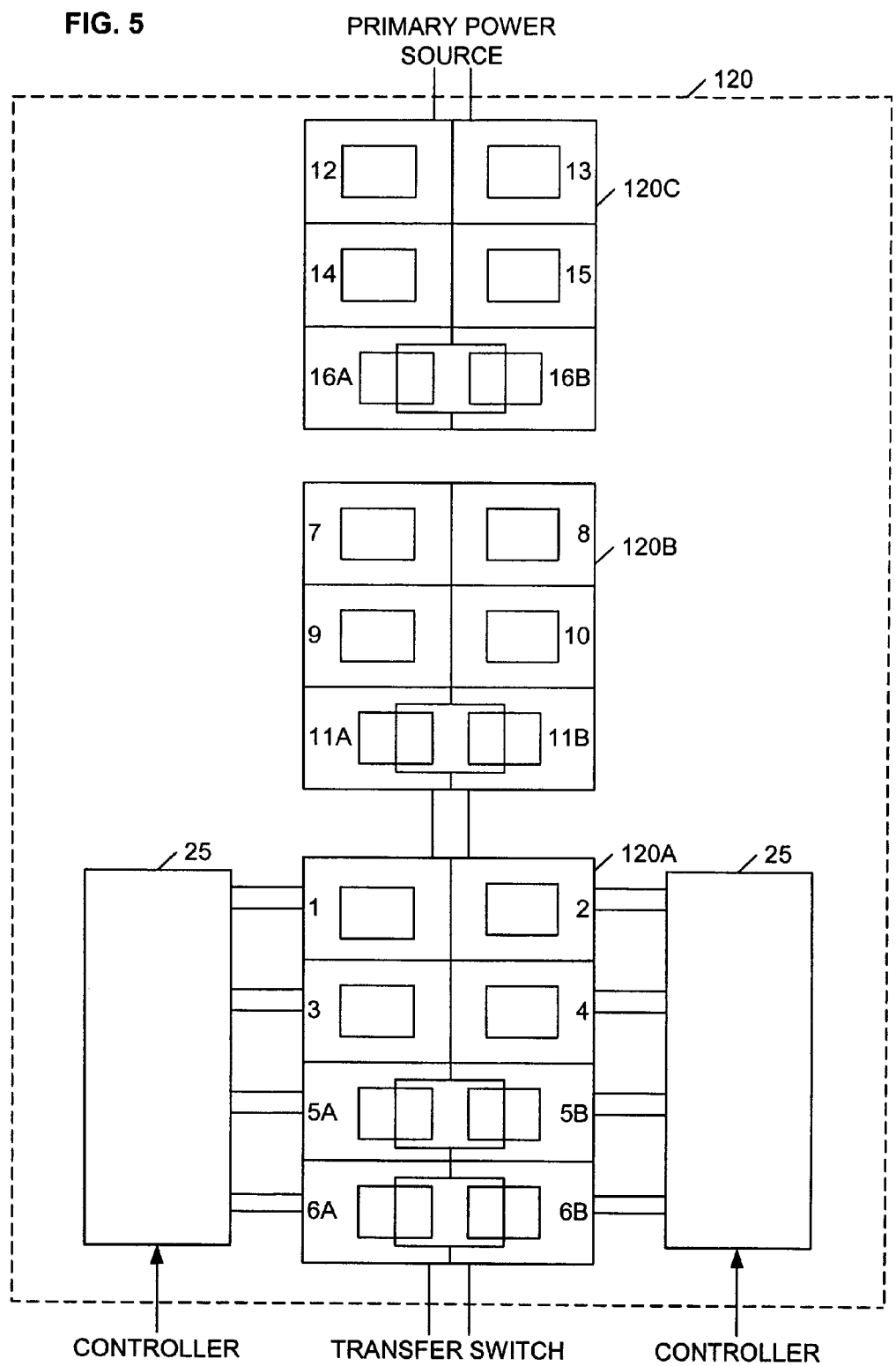

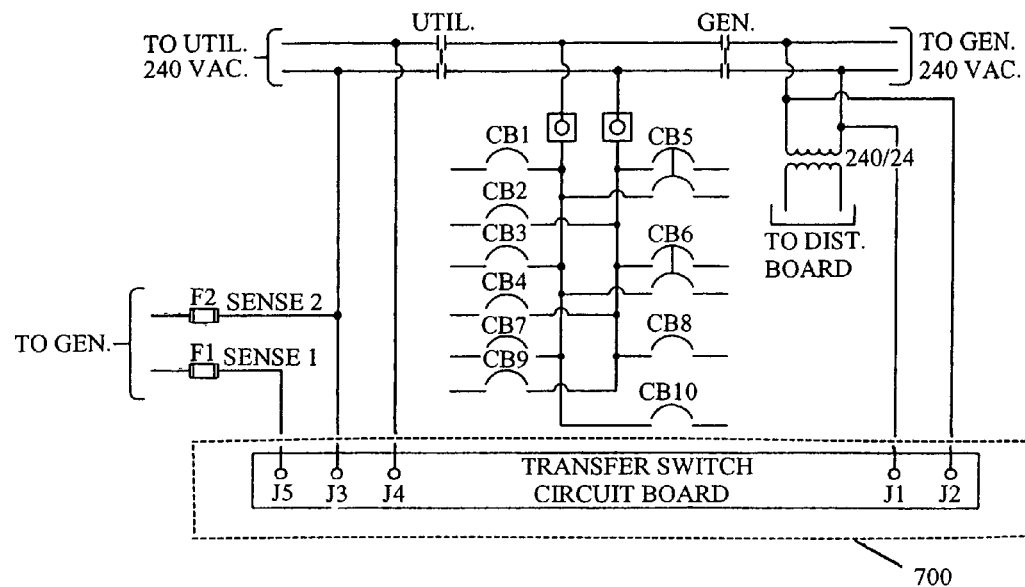
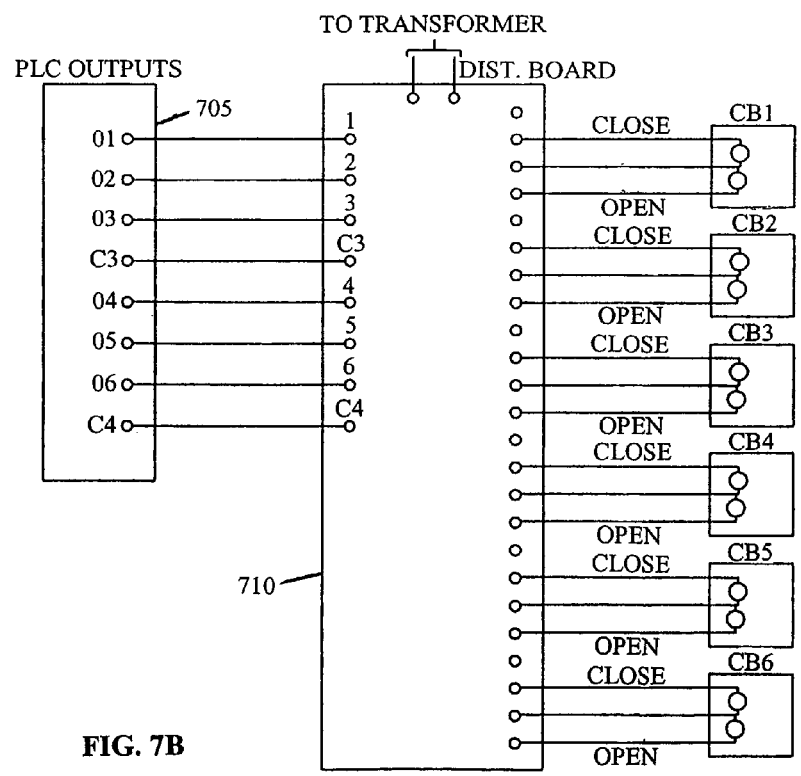
FIG. 7B

BACKUP POWER MANAGEMENT SYSTEM AND METHOD OF OPERATING THE SAME

BACKGROUND OF THE INVENTION

The invention relates to backup power management systems and methods of operating the same.

Typical power transfer systems connect one or more circuit branches to either a primary power source or a secondary power source. Each circuit branch can connect to one or more loads, and typically includes one or more manually controlled circuit breakers that are controllable by an operator. Each circuit breaker includes a closed state where the circuit breaker allows a current, and an open state where the breaker does not allow a current. The manually-controlled circuit breakers change from an open state to a closed state when an operator manually closes the circuit breaker, and change from the closed state to the open state when either the breaker "trips" or an operator manually opens the breaker. It would be beneficial to have a system where the circuit breakers are automatically controlled, thereby providing greater control of the circuit branches and, consequently, controlling the power demand of the loads on the connected power source.

For most power transfer systems located at a residence, the system connects the one or more circuit breakers to a generator acting as the secondary power source. Residential generators vary in size and power output. In general, as the amount of rated power (or current) increases, the size, weight, and cost of the generator increases, and the amount of noise produced by the engine which powers the generator increases. Therefore, it would be beneficial to use a power management system for controlling or reducing the power demand on a generator, thereby allowing a smaller generator to be used for applications that typically require a larger generator.

SUMMARY OF THE INVENTION

Accordingly, in one embodiment, the invention provides a backup power management system connectable to a primary power source and a secondary power source. The system includes a transfer switch connectable to the primary and secondary power sources, and a plurality of circuit branches connected to the transfer switch. The circuit branches include first and second remotely operated branches having first and second remotely operated circuit breakers, respectively. The system further includes a controller connected to the first and second remotely operated circuit breakers. The controller controls the remotely operated circuit breakers, thereby controlling the current through the first and second remotely operated circuit branches.

By using a controller and remotely operated circuit breakers, the backup management system can control which loads are connected to the power sources. Additionally, the system can control when loads are connected to the power sources. For example and in some embodiments, the backup power management system is used in a residential setting, where the secondary power source is a generator. The system of the invention can control or manage which loads are connected to the generator (assuming the generator is powering the loads), and control when the loads are connected to the generator. Controlling the loads allows the system to control power demand on the generator and potentially reduce power demand when compared to manually-controlled circuit branches. Reducing power demand allows a residential owner to use a lower power-rated generator, resulting in a potentially less expense, smaller, quieter generator.

The invention also provides a method of controlling a backup power management system having first and second remotely operated circuit breakers. In one embodiment, the method includes, while the primary power source is providing adequate power, closing the remotely operated circuit breakers, and while the primary power source is not providing adequate power and the secondary power source is providing adequate power, opening and sequentially closing the remotely operated circuit breakers.

Other features of the invention will become apparent by consideration of the detailed description and accompanying drawings.

BRIEF DESCRIPTION OF THE DRAWINGS

FIG. 4 is a block diagram of an exemplary controller used with the backup power management system of the invention.

FIG. 5 is a block diagram of an exemplary group of circuit branches used with the backup power management system of the invention.

FIGS. 7A and 7B are an electrical schematic of a third backup power management system embodying the invention.

DETAILED DESCRIPTION

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings. In addition, the terms "connected" and "coupled" and variations thereof are not restricted to physical or mechanical connections or couplings.

Figure 1:
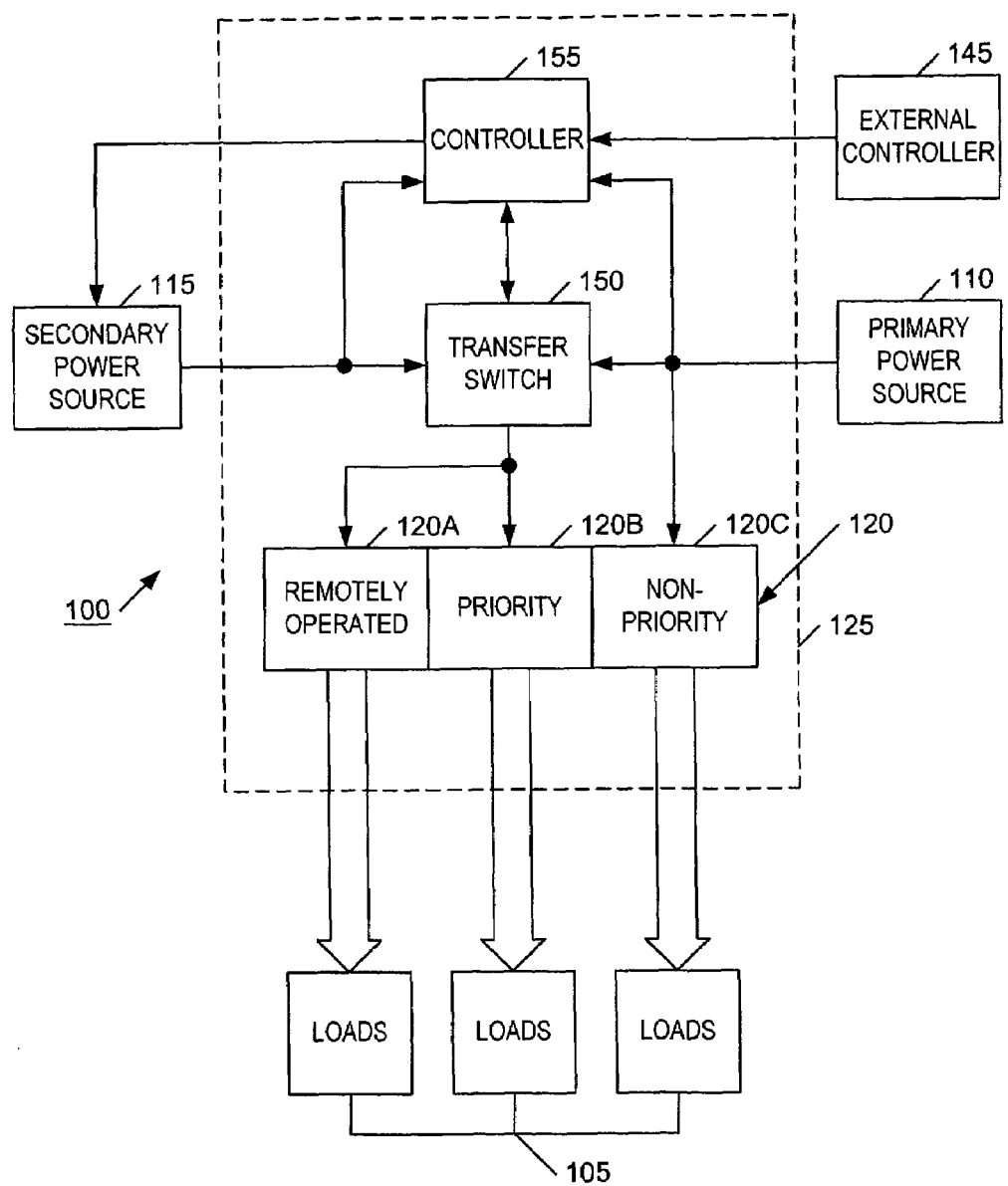
FIG. 1 is a block diagram of a backup power management system embodying the invention.

A backup power management system 100 is schematically shown in FIG. 1. The system 100 controllably connects a plurality of loads 105 to either a primary power source 110 (e.g., a utility power source, a main power source, etc.) or a secondary power source 115 (e.g., a back-up power source such as an "automatic" generator or a "manual" generator). By controllably connecting the one or more loads to the primary or secondary power sources 110 or 115, the primary or secondary power sources 110 or 115 selectively power the one or more loads 105.

As used herein, the primary power source 110 is the power source that provides the preferred power. That is, the system 100 controllably connects the loads 105 to the primary power source 110 when the primary power source 110 provides adequate power (i.e., power of sufficient quality and quantity). Utility power can be power provided by a publicly available power source or company. The secondary power source 115 is an independent source from the primary power source 110, and provides secondary or back-up power preferably when the primary power source 110 fails to provide adequate power. An example secondary power source 115 is a 120/240 Volts AC generator such as the type sold by Briggs & Stratton Power Products Group, LLC under the model number 9779-3. An "automatic" generator is a generator that starts or shutdowns in response to signals provided by the backup power management system 110, requiring no operator interaction with the generator to start it. An automatic generator may be hardwired with the system 100, and the system 100 is typically referred to as an automatic or emergency backup system. A "manual" generator is a generator that requires manual starting, and is typically connected to the system 100 by an operator inserting a plug into a connection box of the system 100 or by starting the generator. For a system including a manual generator, the system 100 may be a "semiautomatic" system, which responds in part to power being provided to the connection box. Unless specified otherwise, the embodiments described below are in a residential setting, the primary power source 110 is utility power, the secondary power source 115 is an automatic generator, and the backup power management system 100 includes an automatic system.

The one or more loads 105 include any number of electrical loads configured to receive electrical power. The loads 105 are connected to the system 100 via circuit branches 120. The circuit branches 120 are either "dedicated" circuit branches or "non-dedicated" circuit branches. A "dedicated" circuit branch includes one or more loads 105 that are hardwire to that branch. For example, if the system were located at a residence, then a central air conditioner, a furnace, and/or similar devices may be hardwired as a dedicated circuit branch. A "non-dedicated" circuit branch includes one or more outlets, connection boxes, or similar connection points that are capable of receiving connections from one or more electrical loads (e.g., lights, electronics, a sump pump, a well pump, a refrigerator, a freezer, etc.)

As shown in FIG. 1, the system 100 is located within a main distribution panel 125 (also referred to as a circuit-breaker panel) with wires either connected to or connectable with the primary power source 110, the secondary power source 115, and loads 105. In other embodiments the system 100 includes a plurality of panels or cabinets in communication with one another. For example and as best shown in FIG. 2, the backup power management system 100 can include three cabinets: a controller cabinet 130, a transfer switch cabinet 135, and a circuit branch cabinet 140 (each of which is discussed further below). For the description below and unless specified otherwise, it will be assumed that the system 100 is located within a single cabinet 125 (FIG. 1).

Referring again to FIG. 1, the system 100 is also connected to an external controller 145, which provides inputs (e.g., data, signals, etc.) to the system 100. For example, the external controller 145 can be a thermostat that generates a call to activate an air conditioner.

As shown in FIG. 1, the system 100 generally includes a transfer switch 150, a group of circuit branches 120, and a controller 155. The transfer switch 125 connects a plurality of circuit branches 120A and 120B to either the primary power source 110 or the secondary power source 115. As used herein, the term "transfer switch" is broadly construed to include one or more transfer switches, one or more relays, and/or one or more contactors, all of which are operable to connect a plurality of electrical loads 105 to the primary power source 110 or the secondary power source 115.

Figure 3:
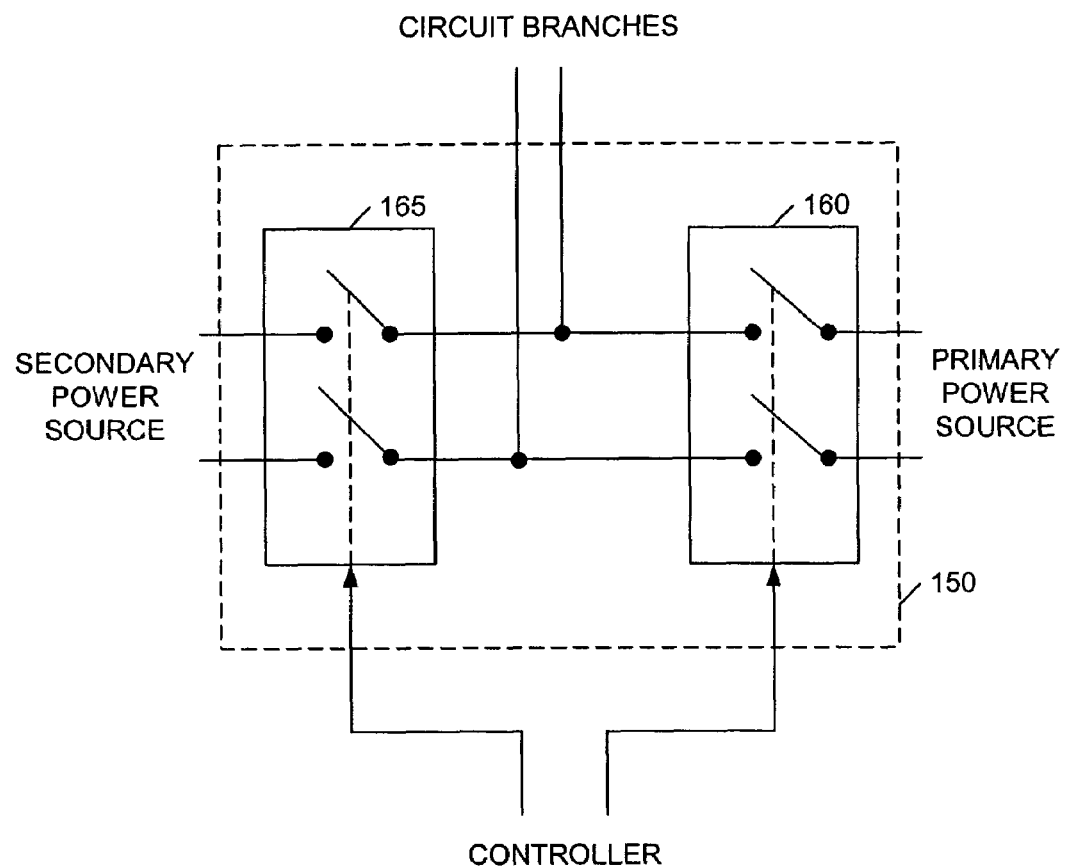
FIG. 3 is an electrical schematic of an exemplary transfer switch used with the backup power management system of the invention.

An exemplary transfer switch 150 is schematically shown in FIG. 3. With reference to FIG. 3, the transfer switch 150 includes first and second relays 160 and 165. The first relay 160 is connected to the primary power source 110 while the second relay 165 is connected to the secondary power source 115. Both of these relays 160 and 165 include one or more bodies or wipes that are movable between a first or open position, where the relay constitutes an open device, and a second or closed position, where the relay constitutes a closed device. The first and second relays 160 and 165 are also connected to one or more circuit branches 120A and 120B (best shown in FIG. 1). When the first relay 160 is closed, the primary power source 110 powers the one or more circuit branches 120A and 120B. When the second relay 165 is closed, the secondary power source 115 powers the one or more circuit branches 120A and 120B. The second relay 165 is open when the first relay 160 is closed and vice-versa. As shown in FIG. 3, the first and second relays 160 and 165 are double-pole, single throw relays. In one embodiment of the relay, the contacting portion of the movable contact includes a first surface directed towards a stationary contact and a second surface engaging the backing portion of the movable contact. The first surface of the contacting portion of the movable contact has a first diameter and a first material (e.g., silver cadmium oxide) and the second surface of the contacting portion of the movable contact has a second diameter which is greater than the first diameter and a second material (e.g., copper). The first surface of the contacting portion of the movable contact is generally conical in shape and terminates at a crown.

Referring again to FIG. 1, the controller 155 controls the transfer switch 150 such that the controller 155 controllably connects the circuit branches 120A and 120B to the power sources 110 or 115. For example and in one embodiment, the controller controls the transfer switch 150 such that the transfer switch connects the circuit branches 120A and 120B to the primary power source 110 when the controller 155 detects adequate power being supplied by the primary power source 110. If the controller 155 does not detect adequate power being supplied by the primary power source 110 and detects adequate power being supplied by the secondary power source 115, then the controller 155 controls the transfer switch 150 such that the secondary power source 115 supplies power to the circuit branches 120A and 120B.

The control of the transfer switch 150 by the controller 155 varies depending on the type of secondary power source 115 used and the type of transfer switch used 150. Additionally, the controller 155 can vary the control of the transfer switch 150. For example and in one embodiment, when the controller disconnects the primary power source from the circuit branches, the controller may wait a time delay before connecting the secondary power source to the circuit branches. Other methods of controlling the transfer switch are discussed below in the operations section.

An exemplary embodiment of the controller 155 is schematically shown in FIG. 4. In general, the controller 155 receives inputs (e.g., from the primary power source 110, the secondary power source 115, and the external controller 145); interprets the received inputs; and provides outputs to the transfer switch 150, the secondary power supply 115, and the circuit branches 120A. As used herein, the terms "inputs" and "outputs" are broadly construed to include data, commands, and/or signals.

For the embodiment shown in FIG. 4, the controller 155 includes a power supply 170, a processor 175, a memory 180, first and second conditioners 185 and 190, one or more input devices 195, and one or more output devices 200. The power supply 170 is connected in circuit with the primary and secondary power sources 110 and 115 and receives power from the sources 110 and 115. The power supply 170 includes circuitry for converting the supplied power to a voltage (e.g., 5 VDC) for powering the controller 155. The power supply 170 can include a temporary storage device (e.g., a chargeable battery, capacitors, etc.) that temporarily provides power if neither power source 110 nor 115 supplies sufficient power for operating the controller 155. In other embodiments, the power supply 170 is not connected to either supply 110 or 115 and is powered by a battery.

Figure 2A:
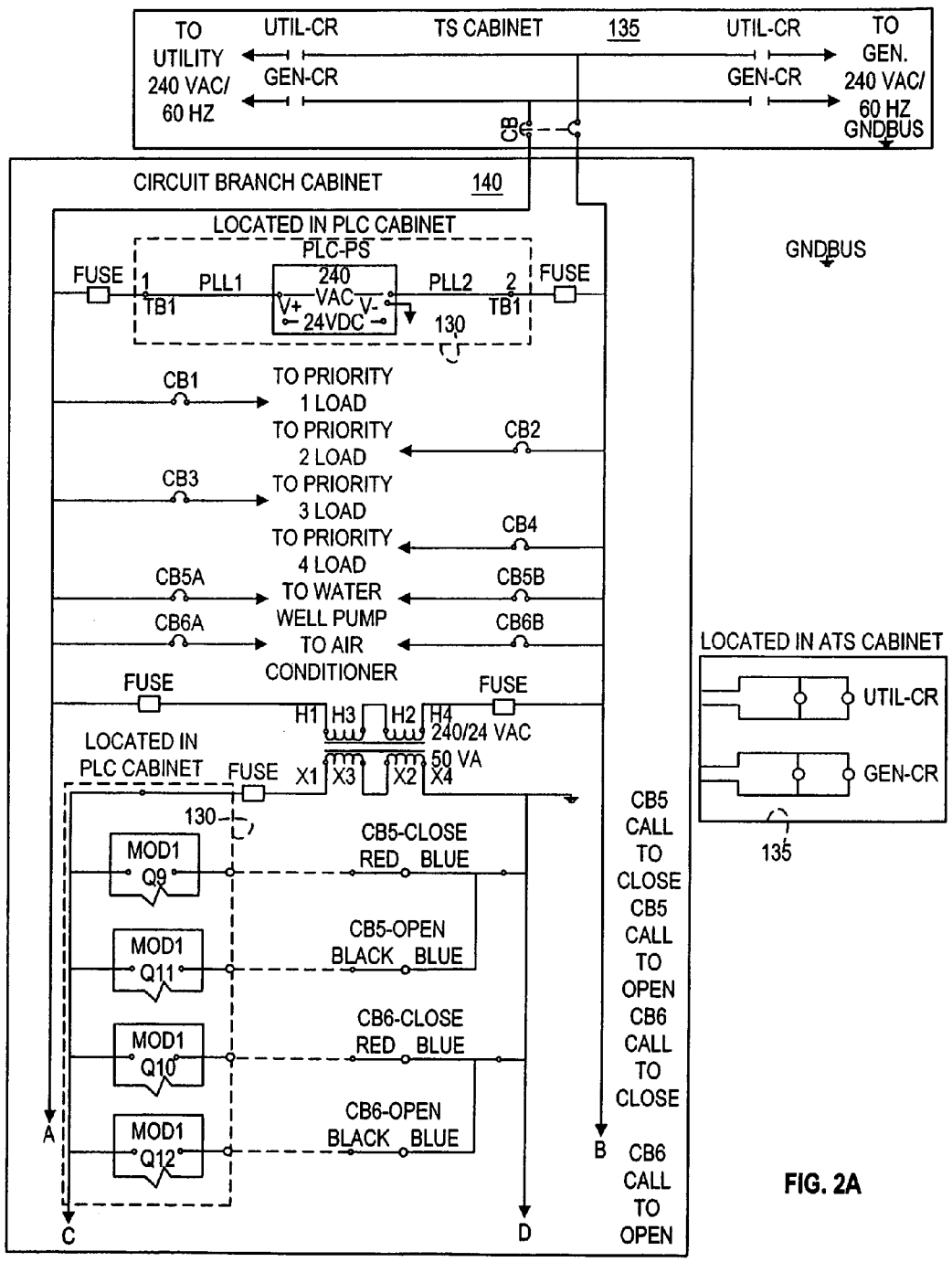
FIGS. 2A and 2B are an electrical schematic of a second backup power management system embodying the invention, the schematic including a controller cabinet, a transfer switch cabinet, a load add/shed cabinet, and a circuit branch cabinet.

The memory 180 includes a program storage that stores one or more software modules having instructions. The processor 175 is a programmable logic controller (PLC) that receives, interprets, and executes the software instructions of the one or more software modules. The processor 175 executes the instructions to control the operation of the system 100 and, to some extent, the automatic generator. However, other devices can be used in place of the PLC. The controller 155 can include or can be constructed with other analog and/or digital logic circuitry, and can include integrated and/or discrete circuit elements. Other processors 175 include a microcontroller, a programmable relay, an application-specific-integrate circuit (ASIC), a microprocessor, and similar devices. Additionally, other elements of the controller 155 can be incorporated with the processor 175. The PLC can be powered by the power received from the power sources as shown in FIG. 2A or can be powered by a 12 VDC battery used for powering an electric starter of an automatic standby generator (best shown in FIG. 7A).

The controller 170 can include other circuitry known to those skilled in the art. For the embodiment shown, the controller 170 includes a first conditioning circuit 185 that provides a first input to the processor 175 when power is supplied by the primary power source 110, and a second conditioning circuit 185 that provides a second input to the processor 175 when power is supplied by the secondary power source 115. The first and second inputs from the conditioners 185 and 190 are functionally related to the primary and secondary power supplies 110 and 115. Other circuitry (e.g., drivers, converters, conditioners, etc.) can also be used with the controller 155. An example controller capable of being used with the invention is a Smart-Pac/Econo-PLC manufactured by Entertron Industries, Inc. of Gasport, N.Y.

The one or more input devices 195 allow an operator to control the system 100 and/or to provide inputs to the controller 155. Example input devices 195 include one or more push buttons, one or more knobs, a keyboard, a keypad, a touch screen, or similar components. The one or more output devices 200 allow the controller to communicate outputs to the operator. Example output devices 200 include a display (e.g., an LED display, an LCD display, a CRT display, etc.), one or more LEDS, one or more incandescent lights, and similar components. Also, the one or more output devices 200 and the one or more operator-controlled input devices 195 can be combined as a single device (e.g., a touch screen). However, as discussed in more detail below, not all embodiments require the one or more input devices 195 and/or the one or more output devices 200.

The group of circuit branches 120 include a plurality of circuit breakers 1–16B (FIG. 5). With reference to FIG. 5, each circuit branch 1–16 includes at least one circuit breaker 1, 2, 3, 4, 5A, 5B, 6A, 6B, 7, 8, 9, 10, 11A, 11B, 12, 13, 14, 15, 16A and 16B, respectively. For example, assuming that the supplies provide 240 VAC, then the circuit branches can be arranged such that a single circuit breaker (e.g., breaker 1) supplies 120 VAC and two circuit breakers (e.g., breakers 5A and 5B) provide 240 VAC. Of course, other arrangements are possible.

As was discussed above, each of the circuit branches 1–16 is either a dedicated circuit branch or a non-dedicated circuit branch. If the circuit branch is a dedicated branch, then the one or more circuit breakers of the circuit branch are hardwired to the dedicated load (best shown in FIG. 2 with circuit breakers CB5A, CB5B, CB6A and CB6B). If the circuit branch is a non-dedicated branch, then the one or more circuit breakers of the circuit branch are connected to one or more outlets, connection boxes, or similar connection points.

The circuit branches are further defined by one of three types: priority 120B, non-priority 120C, and remotely operated 120A. Priority circuit branches 7–11 are connected to the transfer switch 150 and power connected loads (referred to as "priority loads") when power is provided to the transfer switch 150 regardless of the source 110 or 115. Non-priority circuit branches 12–16 are connected to the primary power source 110 and power connected loads (referred to as "non-priority loads") only when power is provided by the primary power source 110. Remotely operated circuit branches 1–6 are connected to the transfer switch 150 and selectively power connected loads (referred to as "remotely operated loads") with power from the primary and secondary power sources 110 or 115. The priority and remotely operated circuit branches 7–11 and 1–6, respectively, are powered by the primary power source 110 when that source 110 powers the transfer switch 150, and are powered by the secondary power source 115 when that source 115 powers the transfer switch 150. The controller 155 controls the determination of whether a remotely operated circuit branch 1–6 supplies power to a load. In one embodiment, all of the circuit branches 120 are remotely operated circuit branches, where the controller 155 sets one or more of the branches to simulate a priority circuit branch or a non-priority circuit branch.

The remotely operated circuit branches 1–6 can be further divided as a first-level circuit branch or a second-level circuit branch. As will be discussed in more detail below, the controller 155 controls the first and second level circuit branches differently. Additionally, the remotely operated circuit branches 1–6 can include other "levels." An example remotely operated circuit breaker (also referred to as an "electronically-controlled circuit breaker") that can be used in a remotely operated circuit branch is sold by Cutler-Hammer of Moon Township, Pa., under the model number BRR-120. Of course, other remotely-operated circuit breakers can be used in the system 100. Additionally, communication between the controller and the remotely operated circuit branches 1–6 can be via a wire harness 25 or similar wiring module.

Figure 2B:
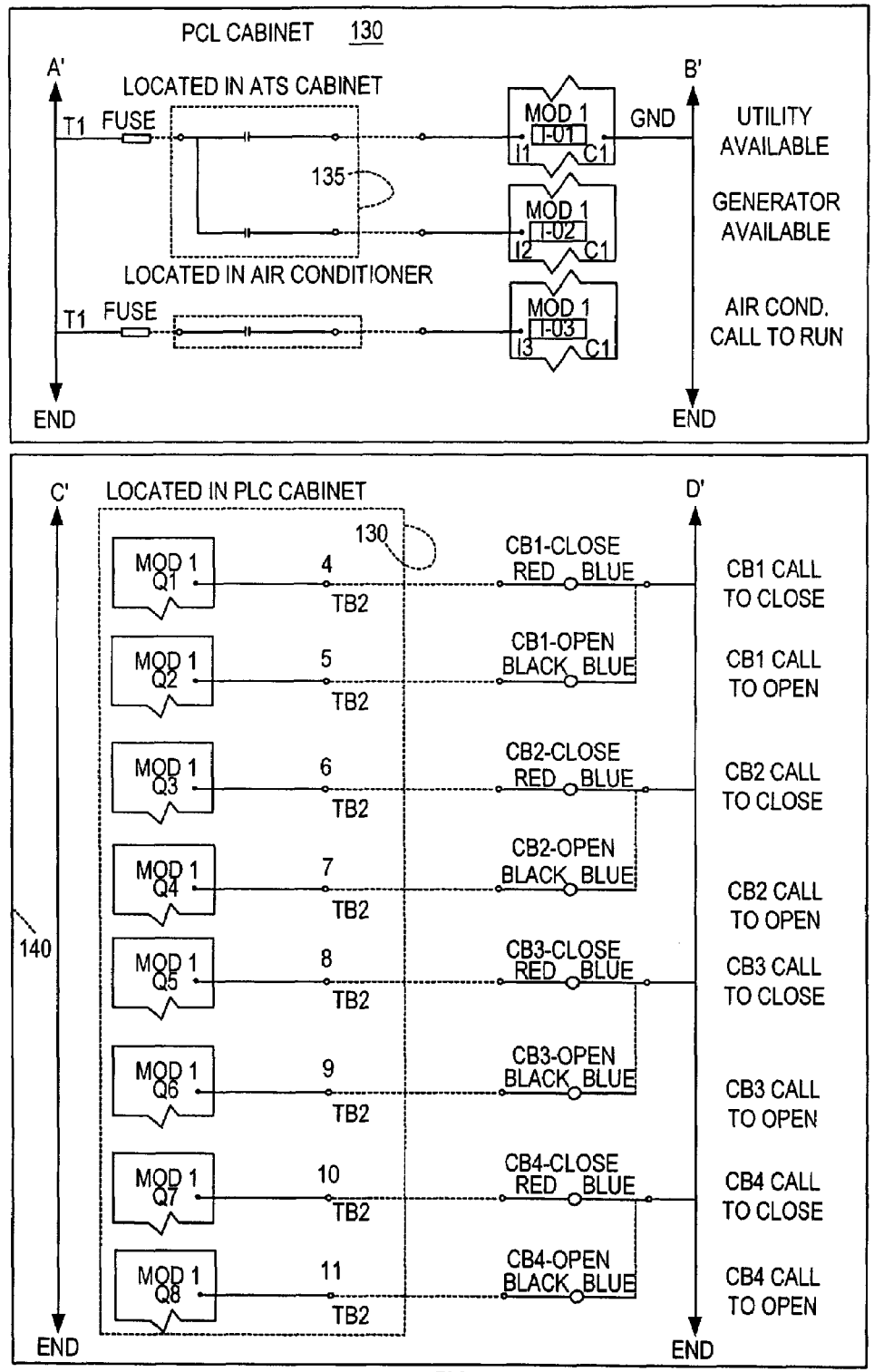

FIGS. 2A and 2B schematically shows another embodiment of the backup power management system 100. With reference to FIGS. 2A and 2B, the controller 155 includes a PLC cabinet 130 having a programmable logic controller (PLC). The PLC is connected in circuit at line 104 such that it is powered when the system 100 receives power from either the primary or secondary power sources 110 or 115. The circuit branch cabinet 140 includes remotely operated breakers CB1, CB2, CB3, CB4, CB5A, CB5B, CB6A and CB6B. Circuit branches 5 and 6 (lines 121 and 124) are dedicated branches and are double-pole breakers, and circuit branches 1, 2, 3, and 4 (lines 110, 112, 115, and 118) are non-dedicated branches and are single-pole breakers.

The circuit branch cabinet 140 further includes a 240:24 transformer that powers outputs Q1–Q12. In other constructions, the transformer can be a 120:24 transformer. The PLC provides outputs Q1–Q12, which control remotely operated circuit breakers CB1–CB6B, respectively. For example, if the PLC provides a first signal that closes Q1 and a second signal that opens Q2, then circuit breaker CB1 will close. Similarly, if the PLC provides a third signal that opens Q1 and a second signal that closes Q2, then circuit breaker CB1 will open.

The transfer switch cabinet 135 includes two relays UTIL-CR and GEN-CR. When the primary power source 110 provides adequate power, the transfer switch controller 155 powers the coil of the UTIL-CR relay, resulting in a first signal being provided to the PLC. When the secondary power source 115 provides adequate power, the transfer switch controller 155 powers the coil of the GEN-CR relay, resulting in a second signal being provided to the PLC.

The system 100 shown in FIG. 2 further includes an input (at line 160) from an air conditioner. When a thermostat calls the air conditioner to run, the call is also provided to the PLC.

Figure 6A:
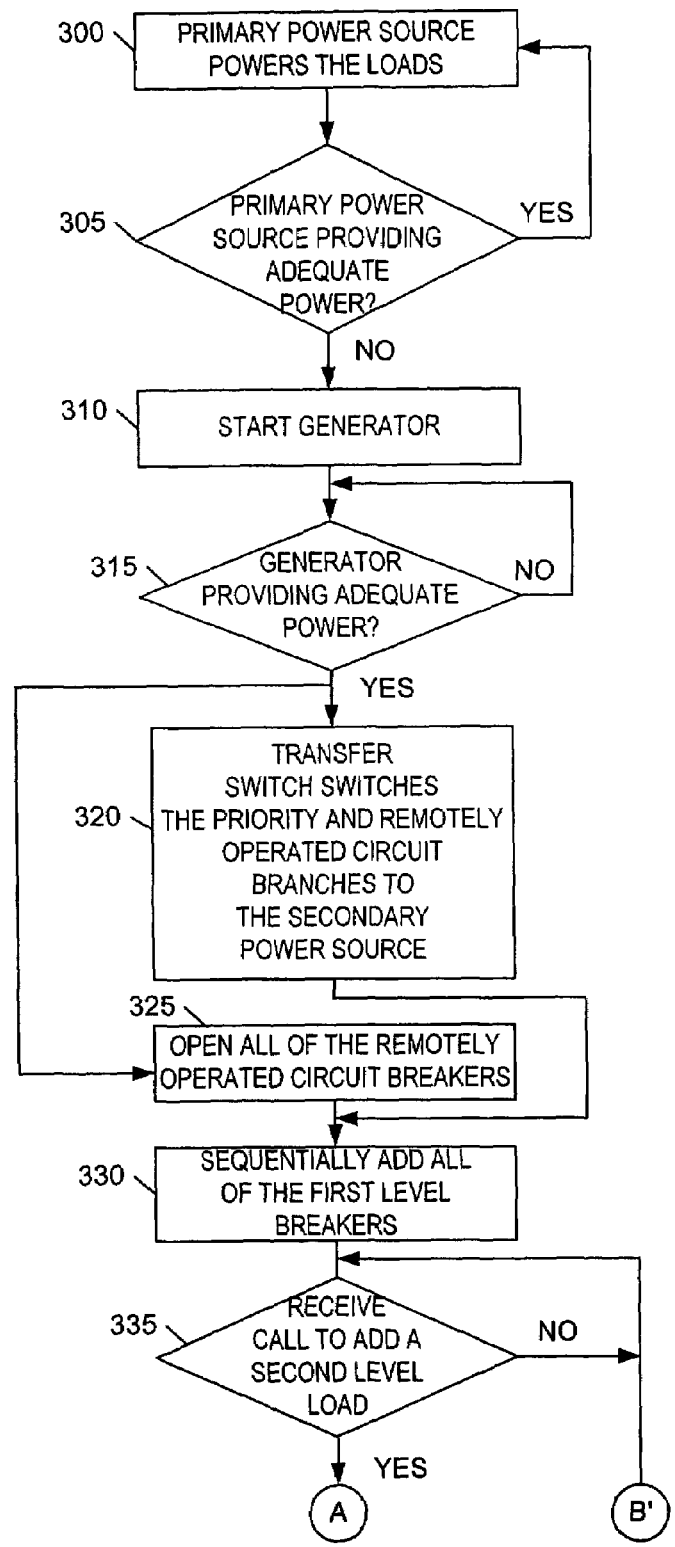
FIGS. 6A, 6B, and 6C are flowcharts representing one method of operating the backup power management system.
Figure 6B:
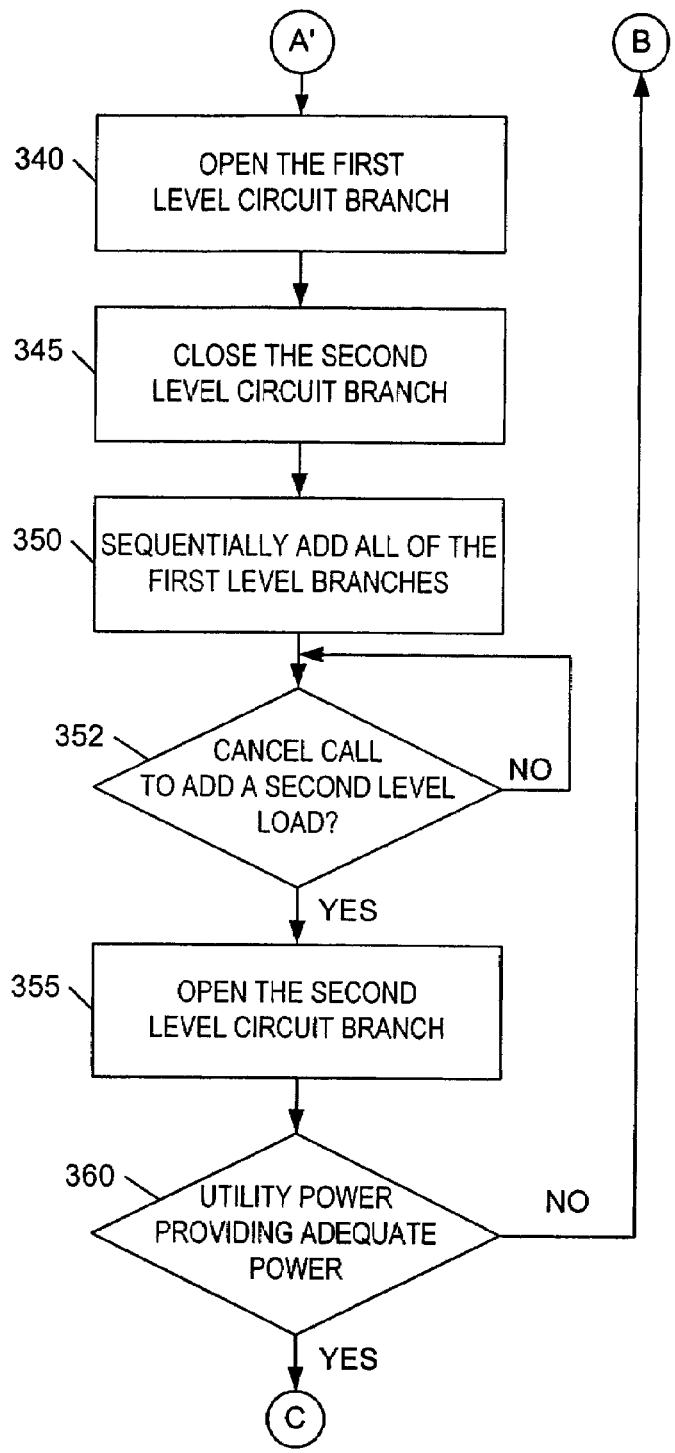
Figure 6C:
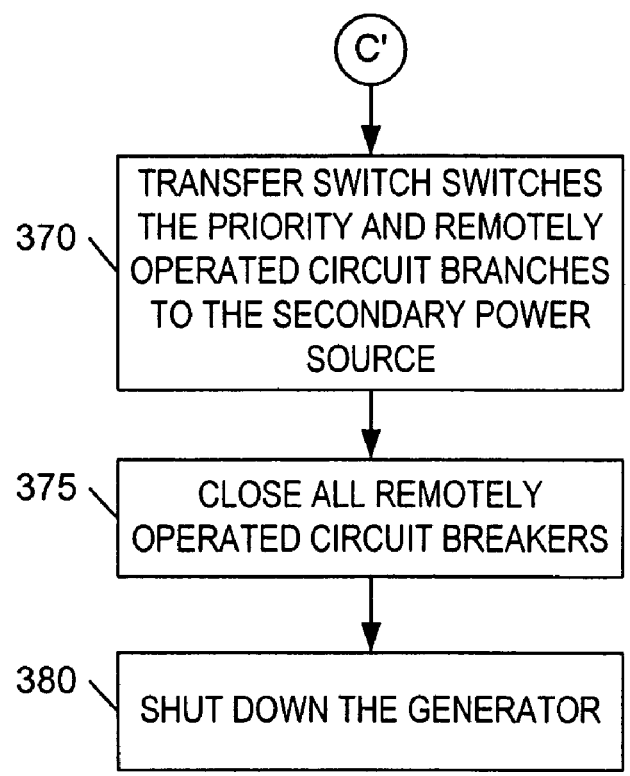

Having described the architecture of various embodiments of the system 100, the operation of the system 100 will now be described. With reference to FIG. 6, it will be assumed that the primary power source 110 initially powers the loads 105 (box 300). That is, unless the circuit breakers are open, the primary power source 110 powers the loads 105 connected to the closed circuit branches 120.

At block 305, the controller determines whether the primary power source 110 is providing adequate power (i.e., power of sufficient quality and quantity) to the system 100. For example, the system 100 may not receive any power from the primary power source 110 (i.e., a black-out condition), or receive power that is lacking in either quality or quantity (i.e., a brown-out condition).

When the controller 155 detects inadequate power, it provides an output to the generator that starts the generator (block 310). Of course, there can be a small time delay before starting the generator.

For the embodiment shown in FIG. 4 and described below, when the controller 150 performs a function, the processor 175 retrieves one or more instructions from memory 180, interprets the retrieved instructions, and executes the interpreted instructions to perform the particular function. For example, if the controller 155 provides an output to the generator to start the generator, then the processor 175 retrieves, interprets, and executes one or more software instructions to generate one or more output signals that activate the generator. Other controllers 155 can perform differently.

Once the generator is generating adequate power (block 315), the controller 155 provides a signal to the transfer switch 150, resulting in the transfer switch 150 connecting the circuit branches 120A and 120B (i.e., the priority and controllable circuit branches) to the secondary power source 115 (block 320). In another embodiment, the transfer switch is operated separately from the controller 155 (e.g., separately from the PLC). For this embodiment, the controller 155 senses a power to the relays 160 and 165 or senses when the relays 160 and 165 are closed. That is the relays can be wired to the controller 155 and the controller 155 can sense which relay is ON.

The loads 105 of the priority circuit branches 7–11 (FIG. 5) are immediately powered by the secondary power source 115. For example, if a furnace or similar heating system is a priority load connected to a priority circuit branch (e.g., branch 7), then the secondary power source 115 immediately powers the furnace when the transfer switch 150 switches to the secondary power source 115. Other priority circuit branches are powered similarly. The non-priority circuit breakers 12–16B are, in one embodiment, not powered at any time by the secondary power source 115.

For the remotely operated circuit branches 1–6 (FIG. 5), the loads 105 attached to the remotely operated circuit breakers 1–6B are powered according to whether the circuit breakers are closed by the controller 150. For the embodiment described below, all of the remotely operated circuit breakers 1–6B are initially opened concurrently with or just prior to block 320 (block 325). After a small time delay, the controller 155 closes the circuit breaker for a first, first-level load, resulting in the first load being powered. After a second time delay, which may differ from the first time delay, the controller closes the circuit breaker for a second, first-level load resulting in the second load being powered. By sequentially adding the first-level loads (block 330), the generator is not overburdened by an initial power drain due to the managed loads activating or starting at the same time.

For example, if the system 100 is located in a residential setting, then the system 100 may power a refrigerator, a freezer, a sump pump, and a well pump. If all of these first-level loads are connected to the generator when the transfer switch 150 switches to the secondary power source 115, then the loads will require a larger amount of power and current than if they were activated one at a time. More specifically, the example first-level loads each include a motor that typically requires the greatest amount of power upon starting. If power is provided to the example first-level loads at the same time, then the motors cause a significant power drain on the generator. By staggering the starts, the amount of drain (due to a motor starting) will be less than if all of the motors start at the same time. Staggering the start of the managed devices results in a smaller instantaneous drain at any time, which allows for a smaller generator to power the same loads 105.

The staggering of the first-level loads is repeated until the generator powers all first-level loads. In some embodiments, the control of which circuit branches are first-level branches and the sequence of the powering of the first-level branches can be set by the operator via the one or more input devices 195. Additionally and in other embodiments, the controller 155 can continuously monitor the power supplied by the secondary power source 115 to check the adequacy of the power before adding additional first-level branches. Further and in yet other embodiments, multiple loads can be activated concurrently, allowing for a reduction in the number of outputs from the controller. For example, a first plurality of first-level loads can be powered followed by a sequentially adding a subsequent second plurality of first-level loads.

At block 335, the controller 155 receives an input from the exterior controller that a second-level device needs to be added. The second level device is connected to a second level circuit branch and initially draws a greater amount of power than a first level device. For example, the second level device can be an air conditioner, and the controller can receive a call signal from a thermostat. Upon receiving the call for closing the second-level circuit branch, the controller opens the circuit breakers for the first-level circuit branches (block 340) and, after a small time delay, closes the second-level circuit branch (block 345). After a second time delay, the controller 155 sequentially adds the first-level circuit branches (block 350). Similar to what was discussed above and in some embodiments, the controller 155 can continuously monitor the power supplied by the generator to verify that the generator has sufficient capacity to add another load. The amount of power drawn from the generator is reduced as compared to if there was no control on how loads were being added to the generator. This allows for an operator to use a smaller generator when compared to no load control and requires less overcurrent protection.

When the second-level device is no longer required to run (e.g., the thermostat ceases the call for the air conditioner) (block 352), the controller 155 opens the second level circuit branch (block 355). Blocks 335–360 are repeated while the secondary power source powers the system 100. When the controller 155 senses that the primary power source has provided adequate power for a time period (block 360), then the controller switches the transfer switch 150 such that the primary power source 105 powers the circuit branches 120A and 120B (block 370). The controller 155 also closes all of the remotely operated circuit breakers (block 375) and provides an output to the generator to shutdown (block 380). In other embodiments where the controller (e.g., PLC) 155 operates separately from the transfer switch, the controller 155 detects when relay 160 is closed and when relay 165 is open. For this embodiment, the controller 155 closes all of the remotely operated circuit breakers (block 375) in response to this condition.

While FIG. 6 is shown having a sequence of acts, the order of the sequence can vary and not all acts may be required. For example, blocks 360–380 can occur at any time after block 305. Additionally, the control of the remotely operated loads can vary.

In another embodiment, the controller 155 removes loads depending on the sensed current provided by the secondary power source 115 should the current of the generator get too high. For example, a user can program the sequence of removing loads and the controller 155 can sequentially remove loads depending on the monitored power and current levels. The controller 155 can open the circuit breaker of the lowest priority branch and, should the current level still be too high after a time delay, the controller 155 can open the next lowest priority load. The process can be repeated until the current level is within limits. Variations in how the controller 155 opens and closes the remotely operated circuit breakers are possible.

In one specific embodiment of the invention, the controller 155 includes the power supply 170, the processor 175, the memory 180, and the first and second conditioners 185 and 190. For this embodiment, the processor is preprogrammed with a preset control scheme for controlling the remotely operated circuit branches 120A. Specifically, when the processor 175 receives a signal from a thermostat to activate an air conditioner, the processor 175 opens all of the remotely operated circuit branches 120A; closes the remotely operated circuit branch specified for the air conditioner; and, after a time delay, sequentially closes, in groups, the remaining remotely operated circuit breakers (e.g., for the refrigerator, sump pump, freezer, etc.). This embodiment provides a cost-effective arrangement for remotely controlling a plurality of remotely operated circuit branches 120. That is, the cost of the system is kept low by grouping switches together; eliminating the input device which would otherwise allow the operator to change priorities, delays, etc.; and simplifying the controller to not provide circuitry for load shedding (e.g., removing the current sensors for sensing the attached load).

Figure 7A:
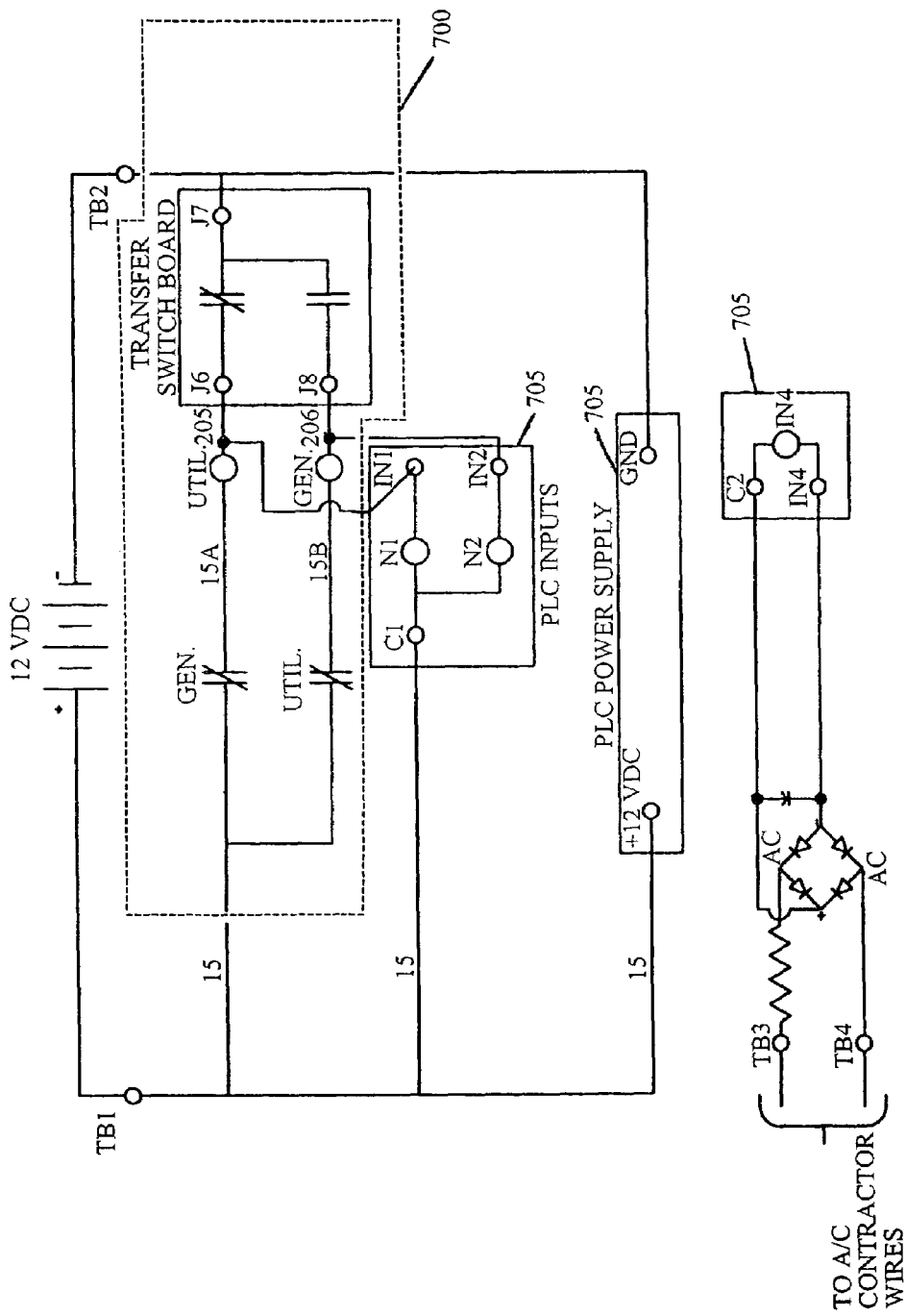

FIGS. 7A and 7B schematically shows yet another embodiment of the backup power management system 100. For the embodiment shown in FIGS. 7A and 7B, the backup power management system generally includes a transfer switch (best shown as ref. no. 700), a controller (best shown as ref. no. 705), a distribution board 710, and a plurality of circuit branches. As describe above for the earlier embodiments, the circuit can be divided among one or more cabinets.

With reference to FIGS. 7A and 7B, the transfer switch 700 is schematically shown as including two DPST relays and a transfer switch circuit board. However, as discussed earlier, other transfer switches can be used.

The controller 705 in FIGS. 7A and 7B is a Smart-Pac/Econo-PLC manufactured by Entertron Industries, Inc. of Gasport, N.Y. The PLC 705 is powered by a 12 VDC battery, and receives inputs (e.g., voltage signals) from the transfer switch 700 and an external controller. The signals from the transfer switch 700 inform the PLC 705 whether power is provided to the circuit branches from either the primary power source (e.g., the utility power source) or the secondary power source (e.g., the generator). For FIGS. 7A and 7B, the external controller is a thermostat and the signal from the thermostat is a call signal being provided from the thermostat to an air conditioner. Based on the signals from the transfer switch 700 and the call signal, the PLC 705 controls the remotely operated circuit breakers (discussed below). As discussed earlier, other controllers can be used in place of the PLC 705.

Referring again to FIGS. 7A and 7B, each circuit branch includes one or more circuit breakers CB1–CB10. Similar to earlier embodiments, a plurality of the circuit breakers are remotely operated circuit breakers CB1–CB6. The remotely operated circuit breakers CB1–CB6 are controlled by the PLC 705, via the distribution board 710. The distribution board 710, which is a quick connect wiring board (or terminal block) capable of directing outputs from the PLC to the remotely operated circuit breakers CB1–CB6, is connected to a 240 VAC/24 VAC transformer. In one construction, the distribution board 710 groups multiple individual circuit branches to the same signal, thereby allowing two or more remotely operated circuit breakers to become "grouped" as discussed in earlier embodiments. Of course, other configurations can be used for providing signals from the PLC 705 to the remotely operated circuit breakers CB1–CB6. Operation of the backup power management system 100 shown in FIGS. 7A and 7B can be similar to the methods of operation discussed earlier.

Thus, the invention provides, among other things, a new and useful backup power management system and method of operating the same.

The invention claimed is:

1. A residential backup power system connectable to a utility power source, an external controller, and a plurality of loads, the system comprising:
   a residential generator;
   a switch connected to the residential generator and connectable to the utility power source, the switch being adapted to controllably provide power received from one of the utility power source and the residential generator;

a plurality of remotely operated first-level circuit branches, each first-level circuit branch being connected to the switch to receive power from the switch and connectable to at least one load, each first-level circuit branch further including at least one remotely operated circuit breaker and having one of an open state and a closed state;

a remotely operated second-level circuit branch connected to the switch to receive power from the switch and connectable to at least one load, the second-level circuit branch including at least one remotely operated circuit breaker and having one of an open state and a closed state; and a controller connected to the circuit breakers and the external controller, the controller being adapted to control the circuit breakers thereby controlling the states of the first- and second-level circuit branches, the controlling of the first- and second-level circuit branches, after receiving power from the residential generator via the switch is done by, opening the second-level circuit branch;

closing at least one branch of the first-level circuit branches;

receiving an input from the external controller to close the second-level circuit branch;

after receiving the input, opening at least one branch of the closed first-level circuit branches;

after opening at least one branch of the closed first-level circuit branches, closing the second-level circuit branch; and after closing the second-level circuit branch, closing at least one branch of the opened first-level circuit branches.

2. A system as set forth in claim 1 wherein the input includes a voltage signal from the external controller.

3. A system as set forth in claim 1 wherein the external controller includes a thermostat and the input includes a voltage signal from the thermostat.

4. A system as set forth in claim 1 wherein opening at least one branch of the closed first-level circuit branches includes opening all of the first-level circuit branches.

5. A system as set forth in claim 1 wherein closing at least one branch of the first-level circuit branches includes closing a first branch of the first-level circuit branches, and sequentially closing a second branch of the first-level circuit branches.

6. A system as set forth in claim 5 wherein the system further includes a current sensor to sense a current provided by the residential generator and wherein closing at least one branch of the first-level branches further includes prior to sequentially closing the second branch, sensing a current with the current sensor, comparing the sensed current to a predetermined current, and performing the sequentially closing step if the sensed current is less than the predetermined current.

7. A system as set forth in claim 5 wherein closing at least one branch of the first-level branches further includes after sequentially closing the second branch, sensing a current with the current sensor, comparing the sensed current to a predetermined current, and opening the second branch if the sensed current is greater than the predetermined current.

8. A system as set forth in claim 1 wherein closing at least one branch of the first-level branches includes closing a first plurality of branches of the first-level circuit branches, and sequentially closing a second plurality of branches of the first-level circuit branches.

9. A system as set forth in claim 8 wherein the system further includes a current sensor to sense a current provided by the residential generator and wherein closing at least one branch of the first-level branches further includes prior to sequentially closing the second plurality of branches, sensing a current with the current sensor, comparing the sensed current to a predetermined current, and performing the sequentially closing step if the sensed current is less than the predetermined current.

10. A system as set forth in claim 8 wherein closing at least one branch of the first-level branches further includes after the sequentially closing the second plurality of branches, sensing a current with the current sensor, determining if the sensed current is less than a predetermined current, and opening the second plurality of branches if the sensed current is greater than the predetermined current.

11. A system as set forth in claim 1 wherein the plurality of remotely operated circuit branches are connectable to a plurality of loads and wherein the system further comprises:

at least one priority circuit branch connected to the switch to receive power provided by the switch and connectable to at least one priority load, the at least one priority circuit branch being adapted to continuously provide power received from the switch.

12. A system as set forth in claim 11 and further comprising:

at least one non-priority circuit branch connectable to the utility power source to receive utility power from the utility power source and connectable to at least one non-priority load, the non-priority circuit branch being adapted to provide only utility power to the non-priority load.

13. A method of operating a power management system adapted to provide power from a primary power source and a secondary power source to a plurality of loads, the system including a plurality of remotely operated first-level circuit branches and a remotely operated second-level circuit branch, each of the first- and second-level circuit branches being in one of an open state or a closed state, the method comprising:

connecting the plurality of first-level circuit branches and the second-level circuit branch to the secondary power source;

opening the second-level circuit branch;

closing at least one branch of the first-level circuit branches;

receiving an input to close the second-level circuit branch;

after receiving the input, opening at least one branch of the closed first-level circuit branches;

after opening at least one branch of the closed first-level circuit branches, closing the second-level circuit branch; and after closing the second-level circuit branch, closing at least one branch of the opened first-level circuit branches.

14. A method as set forth in claim 13 wherein the input signal includes a voltage signal.

15. A method as set forth in claim 13 and further comprising:
   after closing at least one branch of the first-level circuit branches, opening the second-level circuit branch; and
   repeating the steps of receiving an input to close the second-level circuit branch, opening all the first-level circuit branches, closing the second-level circuit branch, and closing at least one branch of the first-level circuit branches.

16. A method as set forth in claim 13 wherein opening at least one branch of the closed first-level circuit branches includes opening all of the first-level circuit branches.

17. A method as set forth in claim 13 wherein the step of closing at least one branch of the first-level circuit branches includes
   closing a first branch of the first-level circuit branches, and
   sequentially closing a second branch of the first-level circuit branches.

18. A method as set forth in claim 17 wherein the step of closing at least one branch of the first-level circuit branches includes
   prior to the step of sequentially closing the second branch, sensing a current provided by the secondary power source,
   comparing the sensed current to a predetermined current, and
   performing the sequentially closing step if the sensed current is less than the predetermined current.

19. A method as set forth in claim 17 wherein the step of closing at least one branch of the first-level circuit branches includes
   after the sequentially closing step, sensing a current provided by the secondary power source,
   comparing the sensed current to a predetermined current, and
   opening the second branch of the first-level circuit branches if the sensed current is greater than the predetermined current.

20. A method as set forth in claim 13 wherein the step of closing at least one branch of the first-level circuit branches includes
   closing a first plurality of branches of the first-level circuit branches, and
   sequentially closing a second plurality of branches of the first-level circuit branches.

21. A method as set forth in claim 20 wherein the step of closing at least one branch of the first-level circuit branches includes
   prior to the step of sequentially closing the second plurality of branches, sensing a current provided by the secondary power source,
   comparing the sensed current to the predetermined current, and
   performing the sequentially closing step if the sensed current is less than the predetermined current.

22. A method as set forth in claim 20 wherein the step of closing at least one branch of the first-level circuit branches includes
   after the sequentially closing step, sensing a current provided by the secondary power source,
   comparing the sensed current to a predetermined current, and
   opening the second plurality of branches if the sensed current is greater than the predetermined current.

23. A method as set forth in claim 13 and further comprising:
   prior to the connecting step,
      connecting the plurality of first-level circuit branches and the second-level circuit branch to the primary power source; and
      disconnecting the plurality of first-level circuit branches and the second-level circuit branch to the primary power source, when the primary power source provides inadequate power.

24. A method as set forth in claim 13 wherein the primary power source includes a utility power source and the second power source includes a residential generator.

* * * * *

UNITED STATES PATENT AND TRADEMARK OFFICE
CERTIFICATE OF CORRECTION

PATENT NO. : 7,015,599 B2  Page 1 of 1
APPLICATION NO. : 10/652066
DATED : March 21, 2006
INVENTOR(S) : Tim Murphy and Lee Gotcher It is certified that error appears in the above-identified patent and that said Letters Patent is hereby corrected as shown below:

| Column, Line | Reads | Should Read |
|---|---|---|
| Column 5, Lines 16-17 and 19 | "electromagnetic signals 107,105,104" | --electromagnetic signals 107, 105, 104-- |
| Column 5, Line 52 | "signals 131, and" | --signals 131 and-- |
| Column 6, Lines 34-36 | "a memory-cell array coupled to the address decoder, control circuit, and read/write circuit, the memory-cell array; and" | --a memory cell array coupled to the address decoder, control circuit, and read/write circuit; and-- |
| Column 7, Line 2 | "converter mounted on the chip" | --converter is mounted on the chip-- |

Signed and Sealed this

Thirtieth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,015,599 B2
APPLICATION NO. : 10/609108
DATED : March 21, 2006
INVENTOR(S) : Philip Gull et al.

It is certified that error appears in the above-identified patent and that said Letters Patent is hereby corrected as shown below:

This certificate supersedes the Certificate of Correction issued December 30, 2008. The certificate should be vacated since no Certificate of Correction was granted for this patent number.

Signed and Sealed this

Third Day of February, 2009

JOHN DOLL
*Acting Director of the United States Patent and Trademark Office*